No. 644,325. Patented Feb. 27, 1900.
F. G. KAMMERER.
WATER COOLER AND FILTER.
(Application filed Mar. 22, 1899.)

(No Model.) 3 Sheets—Sheet 2.

Witnesses:
Carl H. Cranford
William L. Hall

Inventor:
Frank G. Kammerer
by Poole & Brown his Attys.

No. 644,325. Patented Feb. 27, 1900.
F. G. KAMMERER.
WATER COOLER AND FILTER.
(Application filed Mar. 22, 1899.)
(No Model.) 3 Sheets—Sheet 3.
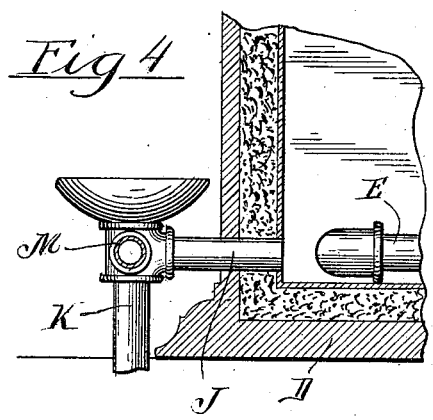
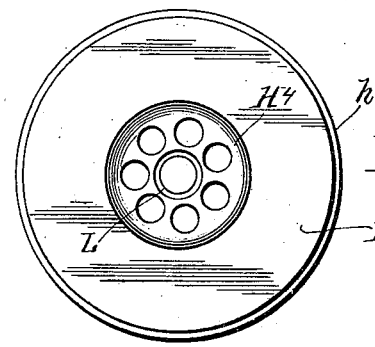
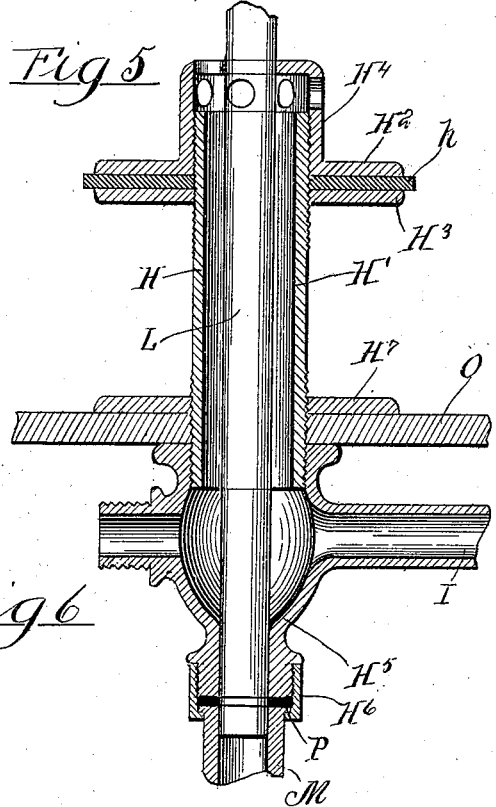
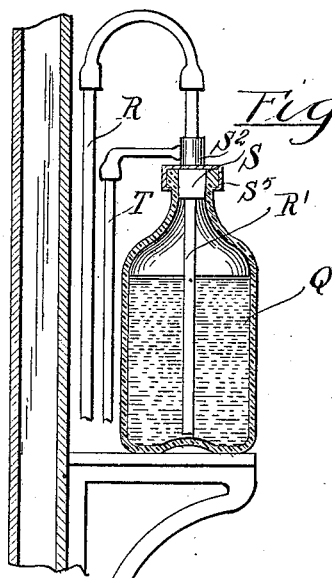
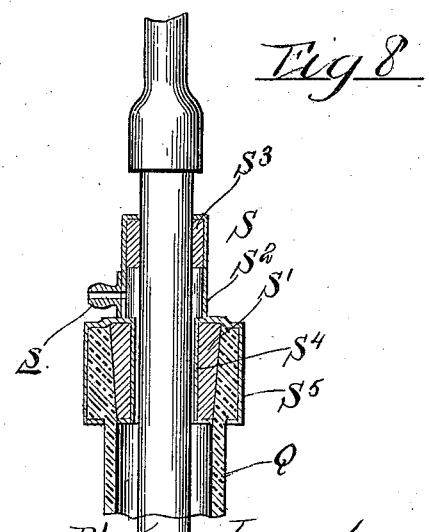
Witnesses:
Carl H. Crawford
William H. Hall
Inventor:
Frank G. Kammerer
By Poole & Brown
his Att'ys

UNITED STATES PATENT OFFICE.

FRANK G. KAMMERER, OF CHICAGO, ILLINOIS.

WATER COOLER AND FILTER.

SPECIFICATION forming part of Letters Patent No. 644,325, dated February 27, 1900.

Application filed March 22, 1899. Serial No. 710,021. (No model.)

*To all whom it may concern:*

Be it known that I, FRANK G. KAMMERER, of Chicago, in the county of Cook and State of Illinois, have invented certain new and useful Improvements in Water Filters and Coolers; and I do hereby declare that the following is a full, clear, and exact description thereof, reference being had to the accompanying drawings, and to the letters of reference marked thereon, which form a part of this specification.

This invention relates to improvements in apparatus for furnishing pure water for drinking or other purposes where pure water is required.

The invention consists in the matters hereinafter set forth, and more particularly pointed out in the appended claims.

Figure 1:
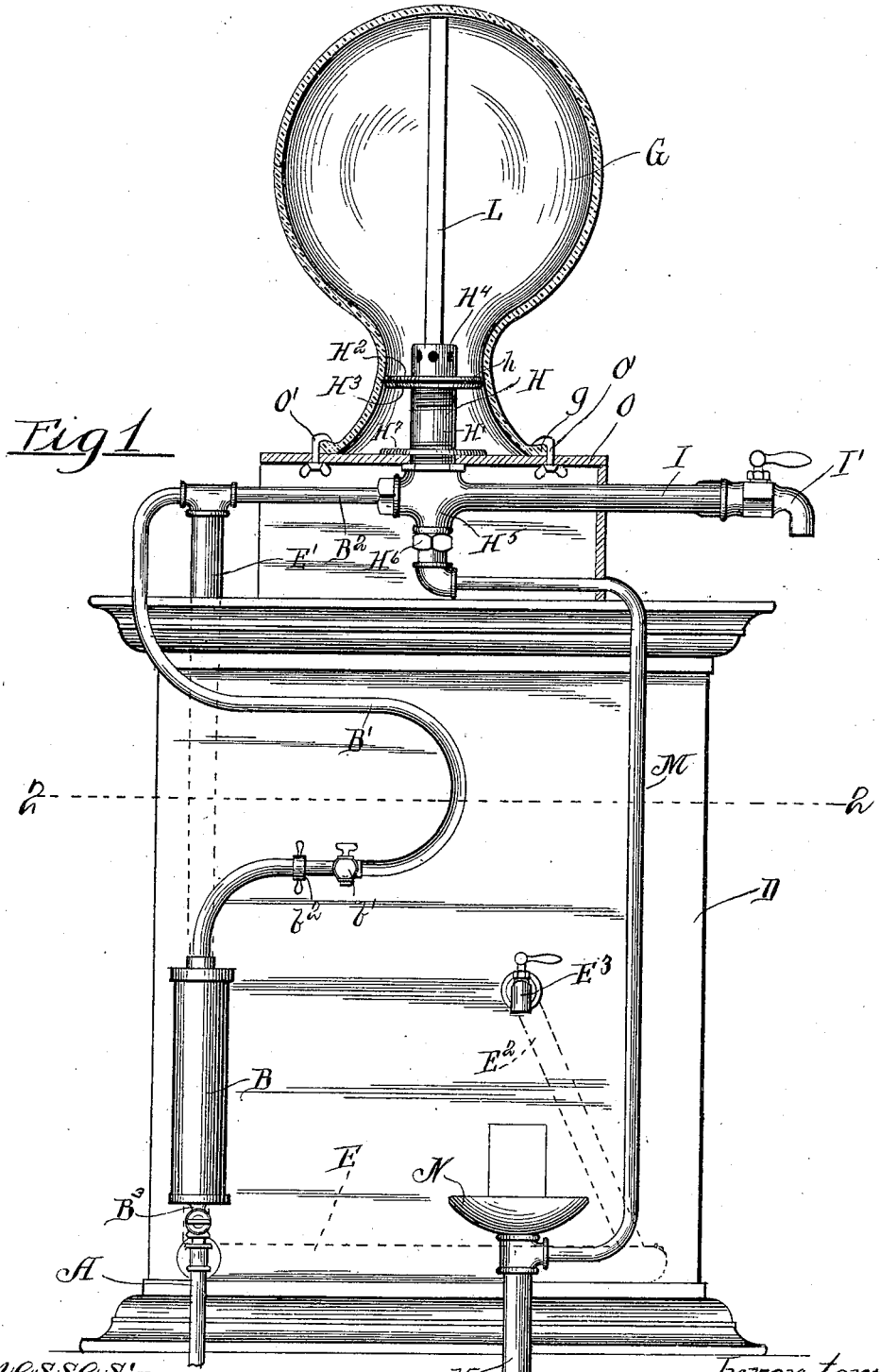
Figure 2:
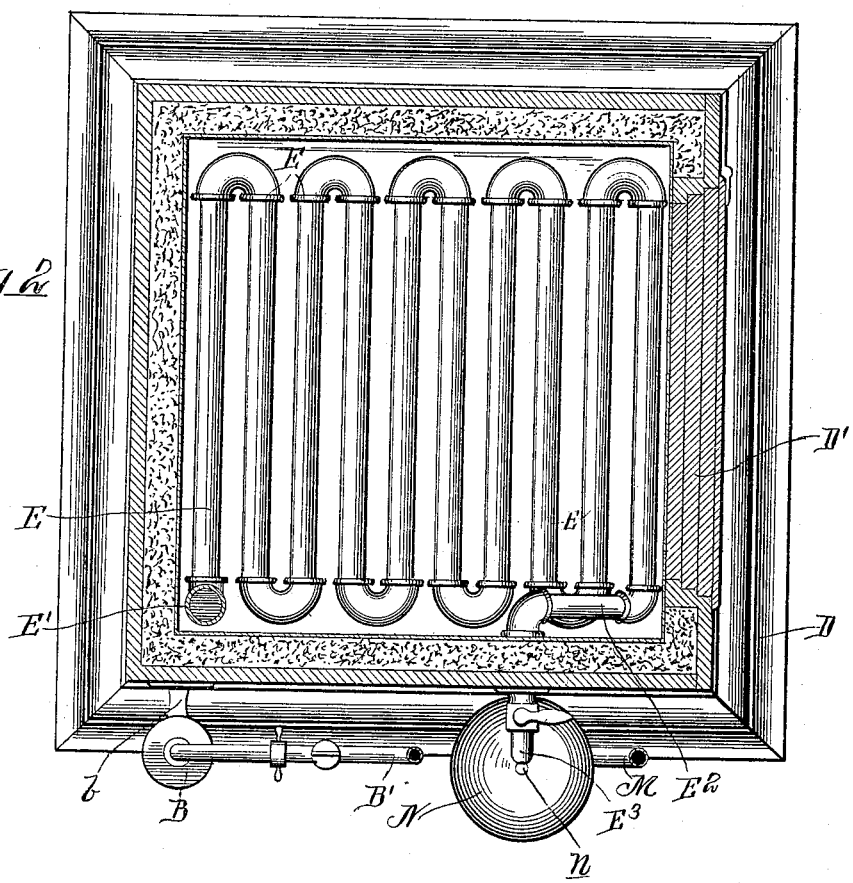
Figure 3:
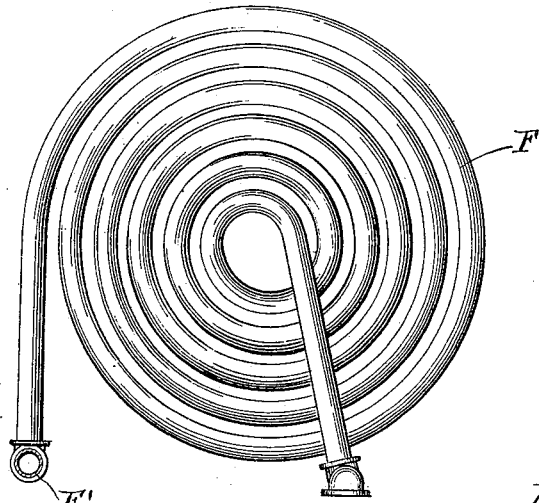

In the drawings, Figure 1 is a side elevation of an apparatus embodying one form of my invention. Fig. 2 is a plan section taken on line 2 2 of Fig. 1. Fig. 3 illustrates a modified form of cooling-pipe for the refrigerating part of the apparatus. Fig. 4 is a fragmentary view illustrating means for disposing of the overflow-water and water from the melted ice in a refrigerator. Fig. 5 is a vertical longitudinal section of the form of stopper for the storage vessel shown in Fig. 1. Fig. 6 is a top plan view of said stopper. Fig. 7 illustrates a modified form of storage vessel. Fig. 8 is a vertical longitudinal section of a stopper adapted for use with the vessel shown in Fig. 7.

The invention herein disclosed is of that kind shown and described in my prior application, Serial No. 699,903, filed December 21, 1898, and refers more particularly to certain features of construction adapted for use in connection with an apparatus of this character.

First, referring to the construction shown in Figs. 1 to 6, inclusive, A designates a water-supply pipe which is connected with a suitable source of water-supply under pressure, as a street-main.

B designates a filter having an inlet-pipe $B^3$, which is connected with the supply-pipe A.

D designates a refrigerator, within which is located a cooling-pipe E, which is connected at one end with the filter by means of pipes B' and E' and at its opposite end with a pipe $E^2$, leading to a faucet $E^3$, located outside of the refrigerator. Said refrigerator is of the usual form adapted to contain ice and is provided on one side thereof with a door D', affording access to its interior. The cooling-pipe is shown in Fig. 2 as consisting of a plurality of parallel pipe-sections connected by U-shaped unions, so as to form a coil, which rests upon the bottom of the refrigerator. Said cooling-pipe may, however, be of other form—as, for instance, as shown in Fig. 3, where it has the form of a flat spiral coil F.

G designates a storage vessel for filtered water, having an outlet in its bottom. Said vessel is shown as made of glass and of generally-spherical form and provided with a flaring mouth surrounded by a flange $g$, by which it is secured to a support beneath it; but it may be made of other material and form, as found most convenient or desirable. Said vessel is in communication with the filter through a pipe $B^2$, connected at one end with the pipe B' and at its other end with a suitable stopper H, which latter is adapted to form a closure for said vessel. The storage vessel will receive water from the filter after the cooling-pipe and the pipe E' have been filled and affords means for storing filtered water, which is supplied in excess of that drawn from the apparatus. A pipe I is connected with the stopper H and provided at its outer end with a faucet I'. Said apparatus is designed to afford means for filtering, cooling, and storing water for drinking and other purposes. Water from the supply A enters the filter and passes from said filter to the storage vessel. Filtered and cooled water may be drawn from the faucet $E^3$, the same having been cooled by passing through the cooling-pipe E in the refrigerator, while filtered, but uncooled water, may be drawn from the faucet I', the same being drawn directly from the storage vessel.

The storage vessel will be provided with an overflow-pipe L, which passes through the stopper H and extends upwardly to within a short distance of the top of the vessel. Said overflow-pipe may be connected at its lower end with any suitable drainage-pipe. The overflow-pipe is provided to prevent excessive pressure within the storage vessel in case the filter should be left in operation until the vessel is completely filled, at which time in the absence of such overflow-pipe the full pressure of the city-main would come on the vessel. Said vessel may, however, be constructed to withstand such pressure, in which case no overflow-pipe will be needed.

The refrigerator is provided at its lower end with an outlet-pipe J, connected with a drainage-pipe K, through which water from the melting ice within the refrigerator may pass off. The overflow-pipe L will conveniently be connected with said drainage-pipe by a pipe M. N designates a drinking-glass holder below the cool-water faucet $E^3$. Said holder is supported upon the drainage-pipe K and is provided centrally with an opening $n$, through which water dripping from the faucet $E^3$ may pass to the drainage-pipe.

The arrangement of the apparatus shown in Fig. 1 is such that the filter and storage vessel are supported upon or sustained by the refrigerator D, the intent being to provide a conveniently-arranged portable device which will take up but little room in an office or house where it may be used. The filter, which may be of any preferred form, is sustained from the side wall of the refrigerator by one or more supporting-arms $b$, Fig. 2, and the storage vessel is supported by the top wall of said refrigerator, said storage vessel resting in this instance directly upon a plate or board O, constituting the upper wall of a casing which is secured to the top wall of the refrigerator and which conveniently incloses the lower end of the stopper H and the adjacent ends of the pipes connected therewith. Said storage vessel is attached to said board or plate O by means of clamping-bolts O', which overlap at their upper ends the flange surrounding the mouth of said vessel and are provided at their lower ends with winged nuts. The pipe E' is connected with the filter discharge-pipe above the level of the refrigerator and passes through a suitable opening in the top wall thereof. Said discharge-pipe of the filter is provided with a valve $b'$ and with a coupling $b^2$, which latter permits the pipe to be disconnected and the filter removed.

A storage vessel having an opening or mouth in its bottom only constitutes, in connection with the filter and discharge-pipe, an important feature of my invention and a feature thereof which may be used separately from the specific form of apparatus shown—as, for instance, such storage vessel may be substituted for the bottle form of storage vessel in the form of apparatus shown in said prior application for patent.

The stopper H, adapted for use with a storage vessel having an orifice at its lower end, is shown in Figs. 1, 5, and 6 and is made as follows: H' designates a tubular casing which extends into the mouth or opening of the vessel and which has communication at its inner end with the interior of the vessel. Between said casing and the inner surface of the neck or opening of the bottle is interposed a suitable packing $h$, said packing consisting, as herein shown, of a flat ring surrounding said casing and clamped between the flange $H^2$ and a nut $H^3$, which latter has screw-threaded engagement with said casing. Said packing-ring consists of any suitable elastic material, such as rubber, and extends beyond said flange and nut and engages the neck of the vessel with a yielding pressure. The flange $H^2$ in the present instance is formed upon the outer end of a cap $H^4$, which fits over and has screw-threaded engagement with the inner end of said casing. Said cap is provided in its side and end walls with radially-directed openings, which afford communication between the casing and the interior of the vessel. With the lower end of said casing is connected the pipe $B^2$, leading from the filter, and the outlet-pipe I. Said pipes are herein shown as attached to or made a part of a removable section $H^5$, which fits over and has screw-threaded engagement with the outer end of said casing. The overflow-pipe L passes through the stopper thus described centrally thereof. Said pipe fits closely at its outer end within a reduced portion of the section $H^5$ and extends beyond said section into the upper end of the pipe M, which leads to the drainage-pipe K. Said pipe M and section $H^5$ are connected by a sleeve $H^6$, swiveled on the pipe M and having screw-threaded engagement with said section and between said section and pipe and surrounding the overflow-pipe and has interposed an elastic packing ring or gasket P, which affords a water-tight joint between said parts. The overflow-pipe passes through and fits closely within an opening in the end-wall cap $H^4$, which serves to hold the inner end of the same in rigid relation to the casing. The lower end of said stopper passes through an opening in the plate or board O and is rigidly connected therewith to hold the same in place within the mouth of the storage vessel G. As herein shown, said stopper is attached to the plate by clamping the latter between a flange on the inner end of a section $H^5$ and a nut $H^7$, which has screw-threaded engagement with the casing H' above said wall. Obviously the stopper may be otherwise secured rigidly in place, as found most convenient or desirable in each particular form of the apparatus. Moreover, the casing for the tubular stopper, consisting of the parts H', $H^4$, and $H^5$, may be made in one piece without affecting the operation of the device.

So far as the particular form of storage vessel and stopper herein shown is concerned said vessel, the filter, and refrigerator may, if desired, be arranged and connected like the similar parts shown in my said prior application are arranged and connected. The construction illustrated in Fig. 1 of the drawings, however, is advantageous by reason of its adaptation to certain uses and is herein made the subject of specific claims.

In Figs. 7 and 8 I have shown the storage vessel provided with an opening in the top thereof and from which the water is drawn by the use of a suitably-arranged siphon. As shown in Fig. 7, Q designates a storage vessel having the form of a bottle open at its upper end, R a pipe which leads from the filter and through which also the water is adapted to be drawn to the cooling-pipe of a refrigerator, and R' designates a siphon-tube extending into the vessel Q and connected with said pipe R, said tube passing through a tubular stopper S, which closes the outlet of said bottle. T designates an overflow-pipe, the upper end of which is connected with said vessel through a passage in the stopper S and which leads to any suitable place for the overflow of water. Said closure embraces, in connection with a cork or stopper S', a metal cap $S^2$, of tubular form, which constitutes an annular chamber above the stopper, and which chamber communicates with a central opening in said stopper which is larger than the siphon-tube which passes therethrough. Said chamber is also connected with a projecting tube $s$, with which the overflow-pipe is connected. Said cap is provided above said overflow-pipe with a packing-ring $S^3$, which surrounds the siphon-tube and forms a tight joint between the same and the cap. With this construction the siphon-tube and overflow-pipe may both be connected with the stopper without making the same unduly large and in a manner to permit the convenient insertion and removal of the siphon-tube and to insure a tight joint between the same and the stopper, while at the same time affording a free communication between the interior of the storage vessel and the overflow-pipe. As a convenient construction in the closure the cap proper has attached to it a depending tube $S^4$, which passes through a central opening in the cork or stopper and has a flange at its lower end adapted to hold the stopper firmly in place in the cap. The top of said cap, moreover, is provided with an inwardly-extending flange which extends over the packing-ring and serves to confine the same in place. In some cases it may be desirable to secure the closure firmly in the mouth of the vessel—as, for instance, when the same is subject to considerable internal pressure. I provide in connection with the cap referred to a device by which it may be secured to the neck of the vessel when said neck is provided with a flange like that of an ordinary bottle. This holding device may be of any suitable form; but as a convenient construction said cap is provided with a depending flange $S^5$, surrounding the upper parts of the neck of the vessel and projecting slightly below the flange thereon, so that it may be bent inwardly to confine the cap upon the neck of the vessel. Said cap $S^2$ and its tubular extension $S^4$ constitute a casing corresponding to the casing formed by the parts H', $H^4$, and $H^5$ of the stopper, (shown in Figs. 1 to 6 and previously described,) while the stopper S corresponds with the packing $h$ of said first-described construction. The packing $S^3$ of the stopper S, moreover, corresponds with the packing P or other equivalent packing R, located at the outer end of the pipe L, connected with the stopper H. It is obvious, therefore, that the stoppers H and S are essentially the same in their construction, the operation of one being merely a reversal of the operation of the other—that is to say, in the construction first described the overflow-water passes off through the central pipe or passage, while in the last-described construction the overflow-water passes off through the outer casing. Obviously the form of stopper shown in Figs. 1 to 6 is better adapted for use in connection with a storage vessel having its orifice at its bottom, while that shown in Figs. 7 and 8 is better adapted for use in a storage vessel having an orifice at its top.

I claim as my invention—

1. The combination with a refrigerator, a coiled cooling-pipe therein terminating in a faucet, a filter sustained upon the side wall of said refrigerator, a pipe supplying water under pressure to the filter, a storage vessel supported upon the upper wall of said refrigerator above the level of the cooling-pipe, said storage vessel being in communication with said filter, and a pipe leading from said storage vessel to the cooling-pipe, through which and said cooling-pipe water descends from said storage vessel by gravity.

2. The combination with a refrigerator, a storage vessel, a coiled cooling-pipe in said refrigerator located below the storage vessel and receiving water therefrom by gravity, said cooling-pipe terminating in a faucet, a filter discharging into said storage vessel, a pipe supplying water under pressure to said filter, a pipe or passage leading from the lower part of the refrigerator and connected with a drainage-pipe, and an overflow-pipe in the storage vessel leading to said drainage-pipe.

3. The combination with a refrigerator, a storage vessel, a cooling-pipe for said refrigerator located below the level of the storage vessel and receiving water therefrom by gravity, said cooling-pipe terminating in a faucet, a filter discharging into said storage vessel, a pipe supplying water under pressure to said filter, a pipe or passage leading from the lower end of the refrigerator and connected with a drainage-pipe, a drinking-cup holder under said faucet provided with a passage connecting the same with said drainage-pipe, and an overflow-pipe leading from the storage vessel to said drainage-pipe.

4. The combination with a filter, a pipe supplying water to said filter under pressure, a storage vessel provided with a mouth or opening in its lower side only, a tubular stopper closing said mouth of the vessel, a pipe leading from the filter to said stopper, a discharge-pipe connected with said pipe which leads from the filter to the stopper and leading to a faucet, and an overflow-pipe passing through said stopper and to within a short distance of the top of the vessel and affording a free exit for water and also a free inlet of air thereto.

5. The combination with a refrigerator, a cooling-pipe therein terminating in a faucet, a storage vessel located above the level of the cooling-pipe and discharging therethrough by gravity, a filter discharging into said storage vessel, a pipe supplying water under pressure to said filter, said vessel being provided at its bottom only with a mouth or opening, a tubular stopper in said mouth of the vessel, a pipe leading from the filter to the stopper, a discharge-pipe connected with said pipe which leads from the filter to the stopper and leading to said cooling-pipe, and an open overflow and air-inlet pipe passing through said stopper and to within a short distance of the top of the vessel.

6. A water storage and supply apparatus embracing a storage vessel made in one piece and of glass or the like, and provided with a depending neck forming a mouth or opening in the bottom of the vessel only, a tubular stopper inserted within said depending neck and provided with an annular packing which is compressed between the stopper and the inner surface of said depending neck to make a tight joint between the same and the stopper, a discharge-pipe connected with said stopper and an open overflow and air-inlet pipe passing through said stopper and to within a short distance of the top of the vessel.

7. The combination with a filter, a pipe supplying water to the filter under pressure, a storage vessel, a tubular stopper therefor, an inlet and outlet pipe, and an overflow-pipe, said tubular stopper being provided at its outer end with an opening for the connection of one of said pipes therewith and having also at such outer end a reduced opening for the passage of the other pipe therethrough, a pipe leading from the filter to the said inlet and outlet pipe, and a discharge-pipe connected with such inlet and outlet pipe and provided with a faucet.

8. The combination with a filter, a pipe supplying water to the filter under pressure, a storage vessel, a stopper therefor, an inlet and outlet pipe, and an overflow-pipe, one of which is connected with the tubular stopper outside of the mouth of the vessel and the other of which passes through the said stopper into the interior of the vessel, said stopper being made larger in diameter than the pipe which passes through it and being constructed to afford water-tight joints between the same and the mouth of the vessel and between the outer end of the same and said pipe which passes through it, a pipe leading from the filter to the said inlet and outlet pipe, and a discharge-pipe connected with said inlet and outlet pipe and provided with a faucet.

9. The combination with a water-filter, of a pipe supplying water thereto under pressure, a storage vessel having an orifice in its bottom which is connected with the discharge-passage of the filter and through which water from the filter is delivered through the pressure of water in the supply-pipe, a discharge-pipe leading downwardly from said orifice and through which water is discharged by gravity, said discharge-pipe being provided with a faucet and an overflow and air-inlet pipe passing through said orifice and terminating at the top of the storage vessel, said overflow-pipe being open for the free exit of water and inlet of air.

10. The combination with a storage vessel of glass or the like having an opening at its lower end and a flange at the lower edge of said opening, a plate or board upon which said vessel is supported and to which the same is attached by fastening means engaging said flange, a tubular stopper adapted to close the opening in said vessel, said stopper passing through an opening in said supporting plate or board and being rigidly secured thereto, an inlet and outlet passage in said stopper and an overflow and air-inlet pipe passing through said stopper.

In testimony that I claim the foregoing as my invention I affix my signature, in presence of two witnesses, this 18th day of March, A. D. 1899.

FRANK G. KAMMERER.

Witnesses:
C. CLARENCE POOLE,
C. W. HILLS.